United States Patent [19]

Vroulis

[11] Patent Number: 4,813,664

[45] Date of Patent: Mar. 21, 1989

[54] JOGGING APPARATUS

[76] Inventor: George A. Vroulis, 1116 Bering #16, Houston, Tex. 77057

[21] Appl. No.: 883,594

[22] Filed: Jul. 9, 1986

[51] Int. Cl.[4] .......................... A63H 3/00; B62B 11/00

[52] U.S. Cl. .............................. 272/70.3; 280/87.021; 272/100

[58] Field of Search .................. 272/70.3, DIG. 9, 70, 272/93, 141-142, 67-68, 100, 70.4; 280/87.02 R, 87.02 W; 135/67, 82

[56] References Cited

U.S. PATENT DOCUMENTS

| | | | |
|---|---|---|---|
| 2,981,312 | 4/1961 | Sundberg | 272/70 |
| 3,237,940 | 3/1966 | Johnson | 272/70.3 |
| 3,256,035 | 6/1966 | Garringer | 272/70.4 |
| 3,488,088 | 1/1970 | Goldberg etal. | 272/70 |
| 4,188,966 | 2/1980 | Palmer et al. | 135/67 |
| 4,286,782 | 9/1981 | Fuhrhop | 272/62 |
| 4,334,677 | 6/1982 | Tata | 272/100 |
| 4,375,294 | 3/1983 | Beauchamp | 272/70.3 |

*Primary Examiner*—Richard J. Apley

*Assistant Examiner*—S. R. Crow

*Attorney, Agent, or Firm*—Anastassios Triantaphyllis

[57] ABSTRACT

A jogging apparatus having a frame supported by wheels, handle grip means attached to the frame for gripping the apparatus, the handle grip means being moveable in a generally vertical direction with respect to the frame and spring means being connected to the frame and the handle grip means, the spring means resisting the downward movement of the handle grip means with respect to the frame.

3 Claims, 1 Drawing Sheet

JOGGING APPARATUS

FIELD OF THE INVENTION

The present invention relates to a jogger's aid and, more particularly, to a personal vehicle that provides support for the jogger. Still more particularly, the present invention relates to a vehicle that, while providing support and balance for the jogger, it decreases injury-causing strains on the body and assists the jogger in reversing his downward motion after the jogger's foot impacts the ground.

BACKGROUND OF THE INVENTION

At a time when the necessity of regular exercise to achieve good general health and fitness, jogging has become one of the most popular forms of exercising. Accordingly, a large number of people of all ages engage in jogging and running activities. It is well known that frequent jogging, when done within reasonable limits, is very beneficial for the general physical conditioning of the runner. It is also well known that jogging has a very serious drawback in that it, oftentimes, causes injuries resulting from the nature of the activity. More particularly, it is well known that knee and back injuries and pains are very common among runners, especially those who carry on such activity frequently and for extended periods of time. Furthermore, such injuries are compounded by the fact that joggers oftentimes use hard terrain such as city streets. The knees and the back are the parts of the body most vulnerable to injuries in the case of joggers because the weight of the body exerts a large amount of strain on those parts while the jogger advances.

In the past, several attempts have been made to reduce the amount of strain being exerted on the jogger's body and, more particularly, on the more vulnerable parts thereof by designing special jogging shoes having cushioned soles to reduce the force being exerted on the jogger's body when the jogger's foot impacts the surface of the terrain. Although those cushioned shoes have contributed significantly to the reduction of injuries sustained by joggers and have allowed joggers to pursue their activity for longer periods of time, due to design limitations in jogging shoes, the desired beneficial objectives have not been realized.

Several devices in the form of a vehicle were developed in the past to be used by a jogger and/or a walker. Some of those devices also provide, to a certain extent, support to the user thereof. U.S. Pat. No. 4,375,294 discloses a jogging vehicle having two spaced wheels with a frame extending therebetween. The frame consists of substantially spaced parallel bars with a portion on the bars that may be gripped by the user. The frontal section of the frame has journaled thereto a fork that supports a wheel. The fork is adapted to rotate under restrain so that directional control of the vehicle may be had.

U.S. Pat. No. 2,077,569 discloses a wheel-supported crutch for assisting invalids and others in walking. The device has brake means for applying braking pressure to the wheels.

U.S. Pat. No. 2,843,180 discloses a three-wheel walker's aid, having a generally vertical frame. The upper portion of the frame is connected to a handle. The device further includes brake means for providing braking pressure to one of the wheels of the device.

U.S. Pat. No. 3,180,678 describes a therapeutic or walking exercising vehicle having a frame, two forward and two rearward wheels, a seat, a back rest, and a handle. The apparatus includes means for activating braking pressure on the wheel when the user puts weight on the frame.

U.S. Pat. No. 3,256,035 discloses a walker for invalids. The walker includes a frame having two sides defining a rear opening therebetween, front and rear wheels, a cross-bar between the two sides of the frame, a pair of body supports extending rearwardly from the cross-bar and being adapted to be received under the arm pits of the invalid and means for adjusting the body supports on the cross-bar.

Another valid walker is disclosed in U.S. Pat. No. 4,029,311. The walker includes a rigid frame with improved steerability derived from a combination of uniquely steerable front casters having upwardly and forwardly slanted swivel shafts together with non-swiveling rear wheels that are independently and separately controlled by separate right and left hand brakes.

U.S. Pat. No. 4,211,309 discloses another walker for invalids having a substantially vertical frame being supported by four wheels. The walker includes brake means for applying braking pressure on the wheels.

U.S. Pat. No. 4,211,426 disloses a weight-relieving ambulator for aiding a patient to walk. The ambulator includes a wheel-supported frame, a harness for supporting the body of the patient, and means for providing tension force that applies a lifting force on the body of the patient. The lifting force relieves at least a part of the weight of the patient on the patient's legs to facilitate walking by said patient.

U.S. Pat. No. 4,279,043 discloses a rotatable transfer stand having a round base and an upwardly extending frame. The device is supported by a plurality of casters.

One of the disadvantages of the aforementioned devices is that, with the exception of the device disclosed in U.S. Pat. No. 4,375,294, none of the other devices could be utilized by a jogger. Therefore, none of those devices could be used by a jogger for beneficial purposes. Furthermore, even if use by a jogger were possible of any of those devices, none of the beneficial effects being provided by the present invention would be realized by such jogger.

Although it is for the use of a jogger, the jogging vehicle disclosed in U.S. Pat. No. 4,375,294 has the disadvantage of lacking stability and lacking ability to support part of the weight of the jogger or to relieve at least a part of the weight of the jogger on the jogger's knees and back. Furthermore, that vehicle does not provide any means for reducing the force of the impact being exerted on the foot of the jogger when such foot contacts the surface of the terrain. Furthermore, the vehicle does not provide any means of assisting the lifting movement of the foot of the jogger following such impact. Instead, that vehicle increases the amount of effort of the jogger in that it requires the jogger's directional and carrying efforts while jogging.

The present invention overcomes the aforementioned disadvantages by providing a jogging vehicle that relieves at least a part of the weight of the jogger on the jogger's knees and back by distributing the weight to both arms and legs of the jogger to reduce the injuries being sustained by the jogger, reduces the impact force being exerted on the the foot of the jogger when such foot descends on the surface, and provides a lifting force following such descent to assist the jogger in reversing his downward motion after the jogger's foot impacts the ground while advancing. The present apparatus allows joggers that are prone to knee and back injuries to continue their jogging activities without having to resort to water-relaxed exercises as an alternative.

These and various other objects and advantages of the present invention would become readily apparent to those skilled in the art upon reading the following detailed description and claims and by referring to the accompanying drawings.

SUMMARY OF THE INVENTION

Accordingly, the present invention discloses a jogging apparatus having a frame for surrounding the two sides and the front or back of a jogger, depending on the mode of operation. The frame is supported by two symmetrical, side wheels and a caster wheel at the forward section of the frame and along the axis of symmetry of such frame. Furthermore, the apparatus includes two symmetrical support means, the first being mounted on the first frame section, and the second being mounted on the second frame section. Its support means includes a fixed base and a slidingly moveable force transmission bar being securely attached to the handle. The force transmission bar is attached to the fixed base of the support means by two springs and two shock absorbers. The handle and the first transmission bar are allowed to move in an upward or downward direction, depending on the force exerted thereon. Furthermore, the apparatus includes a braking means activated by brake handles being attached to the support means for applying braking power on the two side wheels.

According to the present invention, a jogger using the apparatus of the present invention grips the handle of the support means and rests his arms thereon while he advances along with the rolling apparatus. A portion of the weight of the jogger is transmitted to the ground through his arms, thereby relieving the knees in the back from a portion of such weight. Furthermore, the springs being between the fixed base of the support means and the slidingly moveable force transmission bar produce the impact force being exerted on the jogger while his foot strikes the ground as he advances and provide an uplifting force provided by the restoring force of the springs following such strike.

BRIEF DESCRIPTION OF THE DRAWINGS

For a detailed description of the preferred embodiments of the apparatus of the present invention, reference will now be made to the accompanying drawings wherein.

DESCRIPTION OF THE PREFERRED EMBODIMENT

Figure 1:
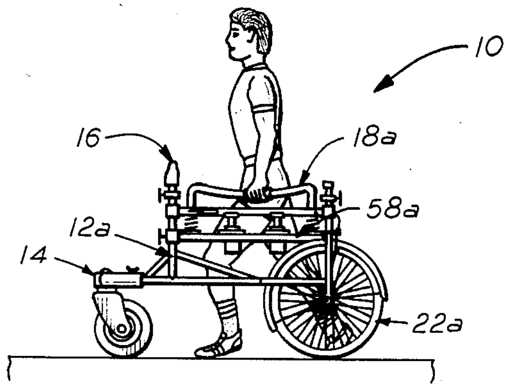
FIG. 1 is a side view of the jogging apparatus of the present invention wherein a jogger is depicted using the jogging apparatus in one mode of operation, and the jogging apparatus is shown in the general, non-detailed presentation.

Referring now to FIG. 1, there is shown a jogging apparatus 10 supporting a jogger while the jogger advances together with such jogging apparatus. It should be understood that FIG. 1 is a general presentation of jogging apparatus 10 to show one mode of operation thereof and it should not be construed as a detailed presentation of the parts thereof. Furthermore, it should be understood that what is presented in FIG. 1 is one mode of operation and that the apparatus may be used with the jogger facing in the direction that is opposite to the direction shown and depicted in FIG. 1.

Figure 2:
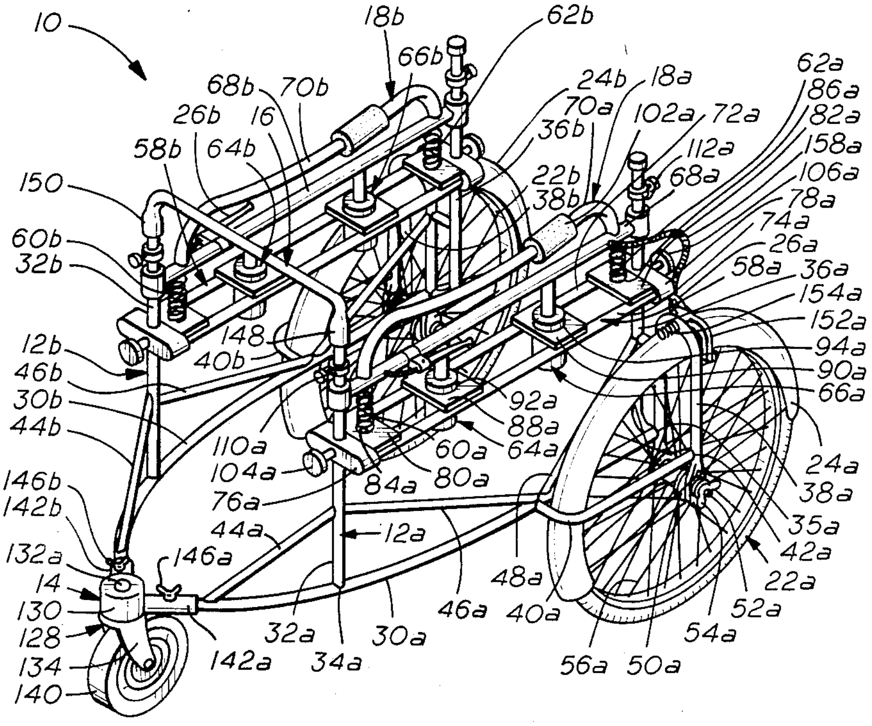
FIG. 2 is a prospective view of the jogging apparatus shown in FIG. 1 in a detailed presentation.

Referring now to FIG. 2 there is shown jogging apparatus 10 having first and second frame sections 12*a, b*, a lower connector member 14, an upper connector member 16, first and second support systems 18*a, b*, first and second wheels 22*a, b*, first and second mud guards 24*a, b*, and first and second brake means 26*a, b*.

First frame section 12*a* includes a first lower bar 30*a*, a first forward post 32*a* being connected to lower bar 30*a* at point 34*a*, a first rear post 36*a* being connected to lower bar 30*a* at the rear end thereof, a generally vertical first fork 38*a* that is also connected to first lower bar 30*a*, at point 35*a*, and a generally horizontal second fork 40*a*. The interior arm of second fork 40*a* is formed by a portion of first lower bar 30*a* and is connected with the interior arm of horizontal first fork 38*a*, at point 35*a*. The exterior arm of second fork 40*a* is attached to the exterior arm of first fork 38*a* at point 42*a*. The open end of first fork 38*a* faces in a downward direction, whereas the open end of the second fork 40*a* faces in a rearward direction. Support bars 44*a* and 46*a* extend diagonally from lower bar 30*a* to first forward post 32*a* to provide support for first forward post 32*a*. Similarly, support bar 48*a* extends from lower bar 30*a* to first rear post 36*a* and provides support for rear post 36*a*. All the components of first frame section 12*a* are connected by welding or similar means to form an integral member.

First wheel 22*a* is received in first and second forks 38*a*, 40*a* and is rotationally mounted to the lower end of vertical first fork 38*a* by conventional mounting means such as hub 50*a*, axis 52*a* and a pair of wing nuts 54*a* (only exterior nut is shown). First wheel 22*a* is a conventional bicycle wheel having spokes 56*a*. First mud guard 24*a* is mounted to first and second forks 38*a*, 40*a* by conventional mounting means such as screws (not shown).

Second frame section 12*b* is a mirror image of first frame section 12*a*. Accordingly, it includes a second lower bar 30*b*, a second forward post 32*b* being connected to lower bar 30*b* and being supported by support bars 44*b* and 46*b*, a second rear post 36*b* connected to second lower bar 30*b*, a third fork 38*b* that is connected to second lower bar 30*b* and a fourth fork 40*b* having an exterior arm that is connected to the exterior arm of third fork 38*b*.

Second wheel 22*b* that is similar to first wheel 22*a* is mounted to second frame section 12*b* like first wheel 22*a* is mounted to first frame section 12*a*. Similarly, second mud guard 24*b* is mounted to second frame section 22*b* like first mud guard 24*a* is mounted to first frame section 12*a*.

First support system 18*a* includes first base rails 58*a*, first and second springs 60*a*, 62*a*, first and second shock absorbers 64*a*, 66*a*, first force transmission bar 68*a*, and first handlebar 70*a*. Base rails 58*a* comprises two parallel, substantially horizontal bars 72*a*, 74*a*, the ends of which are being housed by first and second caps 76*a*, 78*a*. First and second plates 80*a*, 82*a*, are provided adjacent both ends of base rails 58*a* for bridging the gap between bars 72*a* and 74*a* and for providing housing for the bottom ends of first and second springs 60*a* and 62*a* in blind bores 84*a* and 86*a*. Base rails 58*a* further includes third and fourth plates 88*a*, 90*a* for bridging the gap between bars 72*a*, 74*a* and for securely housing the exterior cylinders of first and second shock absorbers 64*a*, 66*a*, in bores 92*a* and 94*a*, respectively.

First force transmission bar 68*a* includes blind bores (not shown) for housing the upper ends of first and second springs 60*a* and 62*a* and for securely housing the upper ends of the pistons of first and second shock absorbers 64*a*, 66*a*. Furthermore, first force transmission bar 68*a* includes first and second sleeves 96*a*, 98*a* being attached to both ends thereof in a generally vertical direction.

First handlebar 70*a* having a generally curved, stretched "M" shape, is securely attached to first force transmission bar 68*a* on both ends thereof via welding or similar means. A first gripping sleeve 102*a*, made of generally resilient material, is reciprocally disposed over first handlebar 70*a*. The position of gripping sleeve 102*a* may be slidingly adjusted along handlebar 70*a*.

In the assembled position, first support system 18*a* is connected to first frame section 12*a* by slidingly disposing first cap 76*a* and first sleeve 96*a* over first forward post 32*a* and second cap 78*a* and second sleeve 98*a* over first rear post 36*a*. Furthermore, in the assembled position, first base rails 58*a* is maintained in a fixed position by first and second threaded knobs 104*a*, 106*a* being threaded against first forward post 32*a* through first cap 76*a* and against first rear post 36*a* through second cap 78*a*, respectively. The fixed position, however, of first base rails 58*a* may be adjusted thereby adjusting the height of first support system 18*a* being mounted on first frame section 12*a* by loosening threaded knobs 104*a*, 106*a* and by telescopically moving first base rails 58*a* up or down the first forward post 32*a* and first rear post 36*a* and by securing said first base rails 58*a* in the new position by first and second threaded knobs 104*a*, 106*a* as previously described.

Contrary to first base rails 58*a* that are maintained in a fixed position, first force transmission bar 68*a* is allowed to move reciprocally up and down first forward post 32*a* and first rear post 36*a*. It should be understood however, that any such upward or downward movement is restricted by the expansion or compression of first and second springs 60*a* and 62*a*, the ends of which are being securely attached to fixed first base rails 58*a* and slidingly moveable first force transmission bar 68*a*.

Spring compression adjustors 110*a* and 112*a* being slidingly disposable and movable over bars 32*a* and 36*a* are provided. Spring compression adjustors 110*a* and 112*a* may be fixed in a particular position along bars 32*a* and 36*a* by threaded knobs and may be used to partially compress springs 60*a* and 62*a* and to shorten the maximum length of springs 60*a* and 62*a* to a length that is smaller than the length of springs 60*a* and 62*a* when those springs are in fully relaxed position. Accordingly, one may adjust the magnitude of the initial compression resistance of springs 60*a* and 62*a* and may limit the maximum extension of springs 60*a* and 62*a* to an extension that is smaller than the extension of the springs when in fully relaxed position.

Second support system 18*b* is a mirror image of first support system 18*a* and is similarly attached to second frame section 12*b*. Accordingly, second support system 18*b* comprises second base rails 58*b*, third and fourth springs 60*a*, 62*b*, third and fourth shock absorbers 64*b*, 66*b*, second force transmission bar 68*b* and second handlebar 70*b*. Second support system 18*b* is attached to second frame section 12*b* in a manner similar to the manner by which first support system 18*a* is attached to first frame section 12*a*.

In the assembled position, lower connector member 14 provides a connection between first and second frame sections 12*a*, *b*, in the lower portions thereof. Lower connector member 14 includes a swivel caster 128 comprising a fixed caster plug 130, a caster stem 132, mounted in an aperture of plug 130, a bifurcated caster frame 134 attached to the bottom of stem 132 and a third wheel 140 rotationally mounted to caster frame 134 by conventional means. Lower connector member 14 further includes two symmetrical, generally horizontal, tubular extensions 142*a*, *b*, adopted for slidingly receiving the ends of first and second lower bars 30*a*, *b*, and for providing a connection between first and second frame sections 12*a* and *b*. The connection between tubular members 142*a*, *b* and first and second lower bars 38*a*, *b* is secured by bolt and wing nut means 146*a*, *b*.

Upper connector member 16, comprising a generally horizontal, elongated section with substantially vertical box ends 148 and 150, provides an upper connection between first and second frame sections 12*a*, *b*, by slidingly receiving the upper ends of first forward post 32*a* and second forward post 32*b* in box ends 148 and 150, respectively. The engagement between upper connector member 16 and first and second forward posts 32*a*, *b*, is secured by pins or similar means (not shown).

First brake means 26*a* for providing braking for first wheel 22*a* includes a first caliper brake 152*a* being attached to the upper end of first fork 38*a* by bolt 154*a* and is adopted to move to an opened and closed position when activated by first brake operator 156*a* that is mounted on first force transmission bar 68*a*. First brake operator 156*a* is a conventional bicycle operator that activates first caliper brake 152*a* via conventional brake hose and wire 158*a*. Second brake means 26*b*, similar to brake means 26*a* is mounted to second force transmission bar 68*b* and second vertical fork 38*b* for providing braking for second wheel 22*b*.

In one operating mode, a jogger positions himself between first and second frame sections 12*a*, *b* and faces towards the direction of swiveled caster 128. In that operating mode, swiveled caster 128 is ahead of the jogger as shown in FIG. 1. In the alternative operating mode, the jogger places himself between first and second frame sections 12*a*, *b* by having his back towards swiveled caster 128, whereby swiveled caster 128 trails the jogger when said jogger advances in a forward direction. Either operating modes could be used with the jogging apparatus and the selection of such modes would depend on the desire of the particular jogger, the terrain, the jogging pace, and other factors.

In either mode of operation, the jogger holds first and second handlebars 70*a*, 70*b* and allows himself to be partially supported by those handlebars. Accordingly, part of the jogger's weight is transferred to the ground through the arms, thereby partially relieving the knees and the back of the jogger from the strain associated with such weight. Furthermore, first, second, third and fourth springs 60*a*, 62*a*, 60*b* and 62*b* decelerate the downward movement of the jogger's body and reduce the magnitude of the impact force to which the body of said jogger is subjected. Furthermore, following the compression of first, second, third and fourth springs 60*a*, 62*a*, 60*b* and 62*b*, caused by the downward movement of the jogger's body, the restoring force of those springs provides a lifting force to the jogger to assist the jogger advances. Such restoring force and the energy associated therewith assist the working muscles of the jogger's body while the jogger advances and such assistance is independent of the "cushioning" assistance provided to the knees and the back by the springs when the feet of the jogger strike the ground.

First, second, third and fourth shock absorbers 64*a,* 66*a,* 64*b,* and 66*b* are provided to regulate the upward and downward movement of first and second handlebars 70*a,* 70*b* and to prevent the random oscillation of first, second, third and fourth springs 60*a,* 62*a,* 60*b* and 62*b.* Shock absorbers with a maximum U of 100 inches per second, a maximum F of 300 pounds and a spring constant K ranging from 1 to 5 pounds-second per inch (1–5 lbs-sec/in.) could be used in the present apparatus. It should be understood, however, that although the use of shock absorbers regulates the upward and downward motion of the first and second handlebars 62*a, b* by preventing the random oscillation of the aforementioned springs, the device of the present invention could be used without such shock absorbers by utilizing springs having spring constants of appropriate magnitude.

First, second, third and fourth springs are conventional springs having spring constants (K) ranging from 30 to 150 pounds per inch with a maximum X of 3 inches and a maximum force of 300 pounds.

While preferred embodiments of the present invention have been shown and described, modification thereof can be made by one skilled in the art without departing from the spirit of the invention.

What is claimed is:

1. An apparatus for use by a jogging or a walking person, comprising:
- a frame having a plurality of generally vertical bars;
- a first base extending between and being connected to a first and a second vertical bar;
- means for securing the connection between the first base and the first and second vertical bars;
- a first spring having a fixed end securely attached to the first base, the first spring being a compression spring;
- a first handlebar moveable in a generally vertical direction, the first handlebar being securely attached to the free end of the first spring;
- a handlebar sleeve being integrally attached to the first handlebar and being slidingly disposed over the first vertical bar; and a first spring compression adjuster being slidingly moveable along the first vertical bar and being securely attachable to the first vertical bar for limiting the movement of the handlebar sleeve along the first vertical bar.

2. An apparatus according to claim 1 wherein the first spring compression adjuster limits the maximum expansion of the first spring to a length that is smaller than the length of the first spring when the first spring is in its fully relaxed position.

3. An apparatus for use by a jogging or a walking person, comprising:
- a frame having a plurality of generally vertical bars, a first frame portion, and a second frame portion being releasably attached to the first frame portion;
- a first base extending between and being connected to a first and a second vertical bar;
- means for securing the connection between the first base and the first and second vertical bars;
- a first spring having a fixed end securely attached to the first base, the first spring being a compression spring;
- a first handlebar moveable in a generally vertical direction, the first handlebar being securely attached to the free end of the first spring;
- a first connector member for connecting the first and second frame portions, the connector member having swiveled caster means;
- a second base extending between and being connected to a third and fourth vertical bars, the third and fourth vertical bars extending from the second frame portion;
- a second spring having a fixed end securely attached to the second base; and
- a second handlebar being moveable in a generally vertical direction, the second handlebar being securely attached to the free end of the second spring.

* * * * *